United States Patent [19]

Milazzo

[11] Patent Number: 4,466,292
[45] Date of Patent: Aug. 21, 1984

[54] PROCESS AND APPARATUS FOR MEASURING THE COACTION TENSILE STRESS IN RIVETED JOINTS

[75] Inventor: Giuseppe Milazzo, Scandicci, Italy

[73] Assignee: Riv-SKF Officine Di Villar Perosa S.p.A., Turin, Italy

[21] Appl. No.: 376,561

[22] Filed: May 10, 1982

[30] Foreign Application Priority Data

Mar. 11, 1980 [IT] Italy .................................. 9575 A/80

[51] Int. Cl.³ .............................................. G01L 1/04
[52] U.S. Cl. ................................................... 73/789
[58] Field of Search ......................... 73/789, 785, 761

[56] References Cited

U.S. PATENT DOCUMENTS 3,242,725 3/1966 Carrie .................................... 73/761

Primary Examiner—Anthony V. Ciarlante
Attorney, Agent, or Firm—Shlesinger, Arkwright, Garvey & Fado

[57] ABSTRACT

The process comprises the following steps: positioning of at least two pieces connected to one another by means of at least a rivet between a stop member and a pressure member disposed to facing contact with one another and movable towards one another; pressing said members toward one another in order to elastically compress them with a predetermined force, and measuring the variation of the length of said rivet which takes place as a result of the elastic deformation of said pieces.

8 Claims, 1 Drawing Figure

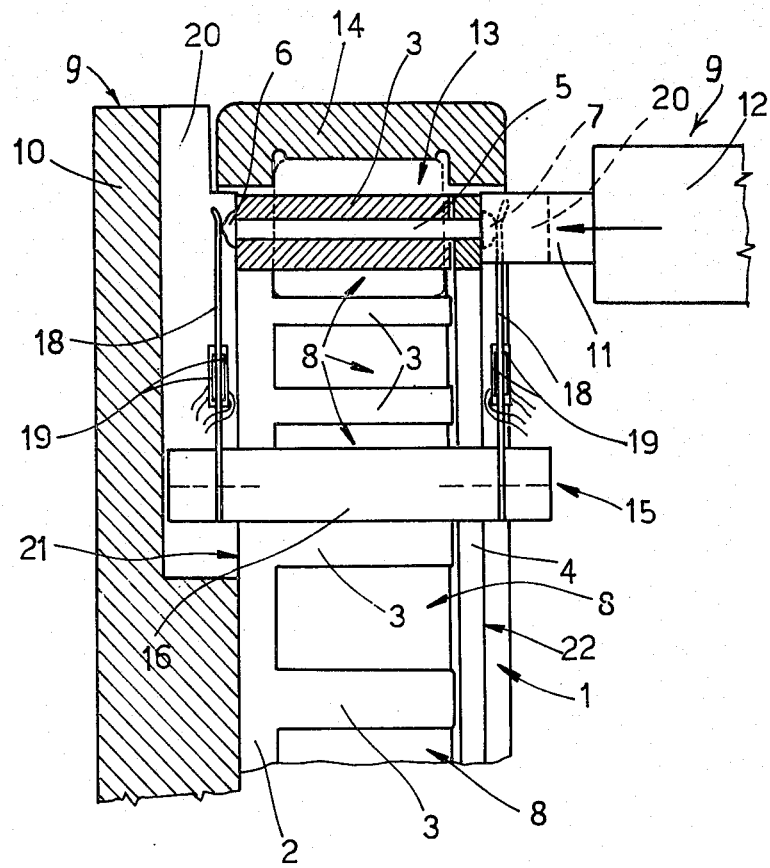

PROCESS AND APPARATUS FOR MEASURING THE COACTION TENSILE STRESS IN RIVETED JOINTS

BACKGROUND OF THE INVENTION

The present invention relates to a process and relevant apparatus for measuring the coaction tensile stress in riveted joints, with particular reference to the riveted joints of cages of straight roller bearings of large dimensions used in railway systems.

In the straight roller bearings of large dimensions, a widely used configuration of the roller guiding cage is that in which the junction is obtained by riveting a ring of rectangular cross-section, referred to as washer, to another ring, referred to as "tenon ring", rigidly connected to as many tenons as are the rollers between which they are interposed. Thus a thick cylindrical zone is created which has openings in the which the rollers are free to rotate.

In the past, the sturdiness and hence the life of the cage was out affected by the stresses which are generated by modern rotation speeds, and the bearing reached the end of its life as result of the wear of the steel which its parts are made of. In fact, the materials and the working were not at such high quality and design levels as they are at present time. In the last several years, the straight roller bearings, better constructed, but subjected to higher stresses, are failing because of loosenings and subsequent breaking of the rivets which, extend into the interior of the tenons to ensure the junction of the washer with the tenon ring. Since it is a fatigue failure, which brings on a rapid seizure of the bearing with consequent breaking of the mechanical members on which it is keyed, it is obviously very important for the rivets to have a mechanical pre-tension sufficient to always ensure a rigid frictional coupling between the said two parts forming the cage. Therefore it is necessary to verify that thereas is mechanical pre-tension of the rivets by rapid and direct measuring during both the manufacturing and the maintenance operations on the bearings. Today, this verification is impossible for the bearings being used, and in many manufacturing firms the control is carried out at very long intervals, by indirect methods which destroy the piece under examination; thus, the desired measuring is carried out by a destructive, and unreliably precise process.

SUMMARY OF THE INVENTION

The object of the present invention is to provide a process and relevant apparatus for carrying out non-destructive testing of riveted joints, which process and apparatus will indicate with precision the reaction tensile stresses to which the rivets are subjected.

This object is attained by the present invention which relates to a process for measuring the mechanical tension of a rivet connecting to one of at least two pieces facing one another, characterized by the following steps:

positioning one of the two pieces against a stop member and positioning a pressure member, disposed at the face of said stop member, against the other of said two pieces, so that said pressure member and said stop member face one another;

bringing said stop member and said pressure member into contact with one another so as to compress said two pieces against one another with a pre-established force in order to produce in them an elastic deformation; and measuring the length variation of said rivet as a result of the compression stress induced into said two pieces by movement of said stop member and said pressure member toward each other.

The invention relates also to apparatus for carrying out non-destructive quality tests on two pieces riveted to one another, comprising:

a stop member and a pressure member facing one another and movable towards one another, between said stop member and said pressure member there being formed a space arranged to accomodate said two pieces which are joined to one another by at least one rivet;

motor means for pressing with a predetermined force, said stop member and said pressure member toward one another so as to compress between them, with a predetermined pressure, said two riveted pieces; and measuring means for detecting the variations of the length of said rivet.

BRIEF DESCRIPTION OF THE DRAWING

For a better understanding of the present invention, an embodiment thereof will now be described, by way of non limiting example, with reference to the annexed drawing which diagrammatically shows test equipment according to the teachings of the present invention for testing the cages of bearings.

DETAILED DESCRIPTION OF THE INVENTION

In the drawing, reference numeral 1 indicates a cage for bearings, in the present case a cage for roller bearings (not shown) of large dimensions for use in railway systems, comprising two pieces formed by a tenon ring 2, provided with a plurality of tenons 3, and a washer 4, made preferably of copper and joined to one another by a plurality of steel rivets 5 provided with riveted opposed end heads 6 and 7, respectively, housed within tenons 3. Thus, the cage 1 has a plurality of openings 8 in which rollers (not shown) of said bearing may be lodged, and the pieces 2 and 4 are angularly connected to one another by frictional coupling, inasmuch as the rivets 5 have been put under tension by means of a pre-tension and therefore they maintain the pieces 2 and 4 elastically compressed against one another.

The cage 1 is mounted on an apparatus 9 for carrying out a non-destructive quality test on at least two pieces of any kind, facing one another and mutually joined by at least a rivet. In particular, the apparatus 9 is apt to detect the mechanical tensile stress, or pre-tension, to which the rivet 5 is subjected. It is clear that the equipment 9, as will be described in detail later, may be used for carrying out measurements on the cage 1 or on any other riveted connection.

The apparatus comprises a stationary stop member 10, formed by a plate, and a movable pressure member 11 facing the member 10 and movable towards it as a result of the actuation of actuator and/or motor means 12, formed for example by an air cylinder, a hydraulic cylinder an electric motor or any other device arranged to linearly move the member 11, by a predetermined force, against the member 10. These latter define between them an area 13 in which the pieces 2 and 4 are disposed, so that these latter are compressed toward one another and against the element 10 as a result of the advancement of the element 11 by adjustable and predeterminable pressure, provided by motor means 12.

In addition, the apparatus 9 is provided with a support element 14 for the cage 1 and with measuring means 15 comprising a gauge 16 provided with two tracers having resilient members 18 facing one another, arranged to cooperate with the heads 6 and 7 of the rivet 5 to detect their mutual displacements so as to substantially measure the variation of the length of the rivet 5 due to the elastic compression of the pieces 2 and 4 against one another. The means 15 includes also transducer means 19 formed for example by four electrical straingauges arranged to detect the elastic deformations of the members 18 originated by the displacements of the heads 6 and 7. The elements 10 and 11, in the embodiment shown, are annular and are provided each with a plurality of seats 20 for housing the members 18 and allowing their free movement and their cooperation with the heads 6 and 7. In a variant not shown, the apparatus 9 is provided also with second measuring means formed by a second gauge similar to the gauge 16, arranged to cooperate with surfaces 21 and 22 of the pieces 2 and 4 in order to measure their relative displacement in the direction of the axis of the rivet 5, and by electronic comparator means, connected both to the straingauges 19 and to transducer means of said second gauge in order to compare the displacement of the surfaces 21 and 22 with the variation of the length of the rivet 5.

The apparatus by means of which the process for measuring the tension of the rivet 5 which connects the pieces 2 and 4 is implemented, operates as follows.

At first, cage 1 is positioned between the elements 10 and 11 so that these latter, when approaching one another, may compress the pieces 2 and 4 against one another, thus slacking the tension in the rivet 5, and at the same time the gauge 16 is positioned so as to make the members to engage with the heads 6 and 7 of the rivet of which it is desired to measure the tension. Then, by starting the motor means 12 the element 11 is moved towards the element 10 thus compressing to one another the pieces 2 and 4 which thus deform elastically and shorten along the axis of the rivet 5. This latter, which owing to the pre-tension results in being under tension and elastically deformed by tensile stress, may compensate the elastic deformation by reducing its own length. However, the variation of the length of the rivet 5 is detected by the members 18 and transmitted by the transducer 19 to suitable known indicator means (not shown).

Thus, the process proposed by the present invention and implementable by means of the apparatus 9 described hereinabove consists in compressing the pieces 2 and 4 against one another in the region of single tenons 3, so as to give rise to an elastic compression of the same and which allows the rivet 5 to freely shorten until the whole elastic deformation due to the pre-tension is fully compensated. By measuring this shortening, and as the modulus of elasticity (E) of the steel and the section (S) of the rivet, as well as its length, are known, the value of the pre-tension is obtained by the known and simple formula:

$$P = (dl \times E \times S)/1$$

where dl is the length variation detected by the measuring means sensors 15. Obviously, the four straingauges 19 applied to the members 18 are suitably calibrated so that they are insensitive to any movement of the rivet 5 during the movement of the elements 10 and 11, except the variation of the length of rivet 5.

A configuration like that described hereinabove allows detection of the values of the total tensile stress for each rivet 5 of the cage 1 or to simply verify whether such value is higher then a determined minimum by choosing, through simple calculations, suitable values of the pressure force p to be exerted in the region of the tenon 3.

By adding another measuring transducer on the cage 1 in accordance with said variant not shown, it is possible to measure in the same manner the idle stroke of the element 11 and, hence, the values of the clearances, if any, between the washer 4 and the tenon ring 2.

An advantageous configuration for controlling all tenons simultaneously, in case large quantities of bearings have to be controlled, may be obtained by widening the configuration just described; a pressure crown may be made to act on the entire cage 1, said crown being provided with a plurality of seating 20 for the passage of a plurality of gauges 16 in number to that of the tenons 3. These will be provided, within the apparatus 9, with radial translation members which will allow to position them on the cage 1 simultaneously. An electronic processor circuit of an well known type and with a completely obvious procedure, in addition to controlling the successive operations, may scan the rivets one at a time or even many of them simultaneously, only indicating the maximum and minimum values amound them which are detected and emitting an alarm signal in case of the controlled piece being unacceptable.

Thus, with the process according to the present invention the piece being controlled is not destroyed, so that it is possible to carry out not only a control of samples only, but also a hundred percent control, for the pieces being produced, as well as for those to be re-utilized, during revision.

Moreover, the system according to the present invention is simple, reliable, economical and of extreme precision.

Finally, from the foregoing it is clear that modifications and variations may be made to the process and relevant apparatus according to the present invention, without departing from the scope of the invention itself. In particular, it is possible to utilize measuring devices of other types, different from the straingauges.

I claim:

1. A process for measuring the mechanical tension of a rivet (5) connecting to one another at least two pieces (2,4) facing and held in contact with each other by the rivet, comprising the following steps:

positioning one of the two pieces (2) against a stop member (10) and positioning a pressure member (11), in alignment with said stop member (10), and against the other of said two pieces (4), so that pressure member (11) and said stop member (10) may be moved toward one another;

moving said stop member (10) of said pressure member (11) toward one another so as to compress said two pieces (2,4) against one another with a predetermined force in order to produce in them an elastic deformation; and measuring the variation of the length of said rivet (5) as a result of the compression stress induced into said two pieces (2,4) by the mutual approaching of said stop member and said pressure member (10,11).

2. A process as claimed in claim 1, characterized in that said stop member (10) is stationary and said pressure element (11) is movable towards said stop member (10) and cooperates with actuator means (12) to push, with a predeterminable pressure, the said pressure member (11) against the said two pieces (2, 4) disposed in face of one another, and consequently these latter against said stop member (10).

3. A process as claimed in claim 1, characterized in that said measuring stop is carried out with the aid of measuring means (15) arranged to cooperate with opposite heads (6, 7) of said rivet (5) in order to detect their mutual displacements.

4. A process as claimed in claim 3, characterized in that the said measuring means (15) comprise members (18) which, during said positioning stage, are brought into contact with said heads (6, 7) and thus are maintained in contact whith these latter during said successive steps, and transducer means (19) arranged for measuring the displacement of said members (18).

5. A process as claimed in claim 1, in which the said two pieces (2, 4) are formed by a tenon ring (2) and by a washer (4) of a cage (1) for roller bearings, connected to one another by a plurality of rivets (5), characterized in that the said stop member (10) and the said pressure member (11) are annular in shape, measuring means (15) being provided in the region of each of said rivets (5).

6. An apparatus for carrying out non-destructive quality tests on two pieces (2, 4) riveted to one another, characterized in comprising:
   a stop member (10) and a pressure member (11) facing one another and movable towards one another, between said stop member (10) and said pressure member (11) there being formed a space (13) arranged to accomodate said two p-eces (2, 4) which are joined to one another by at least a rivet (5);
   motor means (12) for moving, with a predetermined force, said stop member (10) and said pressure member (11) to one another so as to compress between them, with a predetermined pressure, said two riveted pieces (2, 4); and
   measuring means (15) for detecting the variations of the length of said rivet (5).

7. An apparatus as claimed in claim 6, for carrying out tests on cages (1) of roller bearings intended for use in railway systems, characterized in that the said stop member (10) and the said pressure member (11) are annular in shape and have each a plurality of seats (20) for accomodating said measuring means (15).

8. An apparatus as claimed in claim 6, characterized in that the said measuring means (15) comprise a gauge (16) provided with two elastic members (18) disposed facing one another and arranged to cooperate with opposite end heads (6, 7) of said rivet (5) in order to follow their movements, and a plurality of straingauges (19) disposed on the said members (18) and apt to detect the deformations of these members as a result of the displacement of said heads (6, 7).

* * * * *